May 25, 1943.   E. S. OSWOOD   2,319,947
WEED CUTTER FOR OUTBOARD MOTORS
Filed April 23, 1941
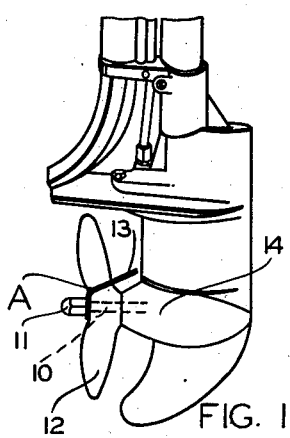
FIG. 1.
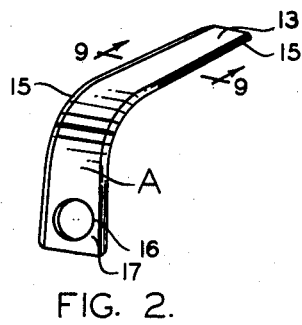
FIG. 2.
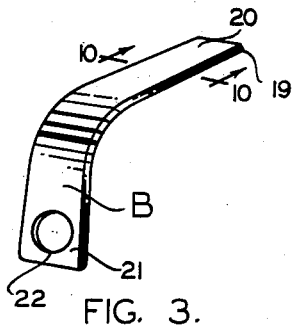
FIG. 3.
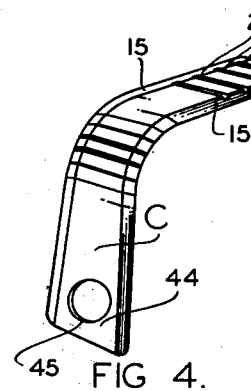
FIG. 4.
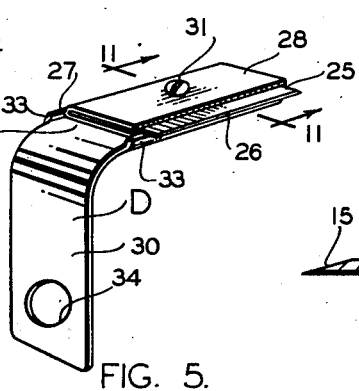
FIG. 5.
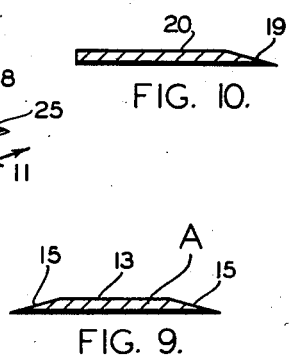
FIG. 10.
FIG. 9.
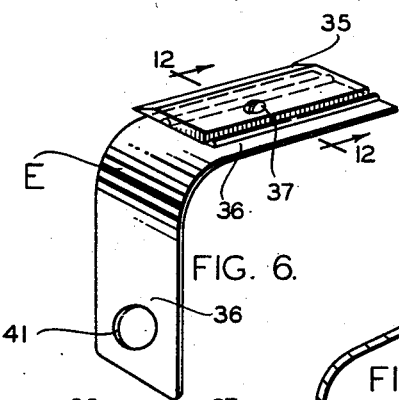
FIG. 6.
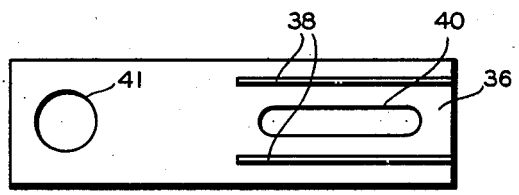
FIG. 8.
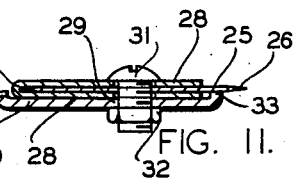
FIG. 11.
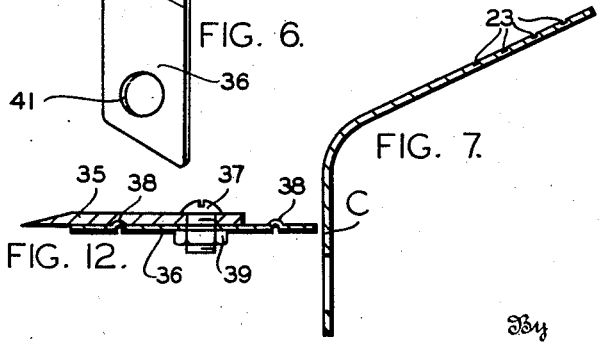
FIG. 7.
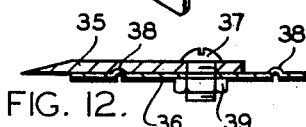
FIG. 12.
Inventor
ELMER S. OSWOOD
By Howard Fischer
Attorney Patented May 25, 1943

2,319,947

UNITED STATES PATENT OFFICE 2,319,947

WEED CUTTER FOR OUTBOARD MOTORS

Elmer S. Oswood, Minneapolis, Minn.

Application April 23, 1941, Serial No. 389,877

8 Claims. (Cl. 115—40)

My invention relates to an improvement in weed cutters for outboard motors and other boat propellers. It is the object of the present invention to provide a weed cutter which will cut weeds that have a tendency to wrap themselves around the propeller and between the propeller and propeller hub. When an outboard motor goes through weeds, some weeds wrap themselves about the propeller blades and between the propeller blades and hub. When this happens, it is necessary to clean the weeds off from the propeller.

In cases where a fisherman is trolling and weeds wrap themselves about the propeller blades, the fisherman must stop his trolling and clean the weeds from the blades. This is very troublesome to a fisherman because of the fact that in trolling it is very important that the motor be kept at a constant speed, and when the weeds wrap themselves about the propeller, they have a tendency to slow down the speed of the motor or stop it.

It is a feature of my invention to provide a simple bladelike weed cutter which is supported on the propeller shaft and held in place by the nut which ordinarily holds the propeller on the shaft. The weed cutter projects between the blades, over the hub and the vertical shaft housing or rudder. A motor equipped with my weed cutter knife blade can travel through weeds without the same entangling in the propeller blade. Thus my weed cutter keeps the propeller blades as well as the housing free of entanglement of weeds and permits the use of the motor through patches of weeds without difficulty.

It is a further feature of my invention to provide a weed cutter for water propellers which is formed with a double beveled cutting edge which can be used on a motor which turns clockwise and counter-clockwise. Some of the outboard motors of today are made in such a way that they can be rotated in either clockwise or counter-clockwise direction, and by using a double edge weed cutter, the weeds will be cut in the rotation of the propeller blades in either direction. The weed cutters are provided with means so that they can be supported to the propeller shaft of the outboard motor by the same nut which holds the propeller to the operating shaft. By constructing my weed cutter in such a manner, it is a very easy task to place the weed cutter on an outboard motor.

An alternative form of my weed cutter is adapted to use an ordinary razor blade for the cutting element of the same. In using a weed cutter which has razor blades to cut the weeds, a new sharp blade can be inserted at any time. I have provided means so that the sharp edge of the razor blade can be directed to either side of the supporting arm for clockwise and counter-clockwise rotation of the propeller. There are adjustments on the weed cutter arm where the razor blade can be tightened by means of a nut and grooves.

It is an object of my invention to provide a weed cutter which is made of strap-like material, which has a beveled cutting edge on one side. This weed cutter is used where the motor boat propeller has only one direction of rotation. The weed cutter has a hole in the arm-like member where it can be slipped over the shaft and tightened by means of a nut which also serves the purpose of holding the propeller to the operating shaft.

My weed cutter may be designed to fit all types of outboard motors and other propeller blades of various types of water motors.

These and other objects and novel features of my invention will be more clearly and fully set forth in the following specification and claims.

In the drawing forming a part of my specification:

Figure 1 is an elevational view of the housing of an outboard motor, showing the location of the weed cutter and the propeller.

Figure 2 is a perspective view of a double edge weed cutter.

Figure 3 is a perspective view of a weed cutter having one cutting edge along one side.

Figure 4 is a weed cutter similar to that shown in Figure 2, which has scored grooves in order that the weed cutter can be made to various lengths.

Figure 5 is a perspective view of a weed cutter having a razor blade for its cutting edge.

Figure 6 is a perspective view of a weed cutter having a removable cutting blade.

Figure 7 is a sectional view taken through Figure 4 of the drawing.

Figure 8 is a top view of the strap-like arm shown in Figure 6, shown in its flat position before it is bent.

Figure 9 is a sectional view indicated by the line 9—9 of Figure 2.

Figure 10 is a sectional view indicated by the line 10—10 of Figure 3.

Figure 11 is a sectional view indicated by the line 11—11 of Figure 5.

Figure 12 is a sectional view indicated by the line 12—12 of Figure 6.

My weed cutter A illustrated in Figure 1 of the drawing is shown bolted to the propeller shaft 10 by means of a nut 11 which also serves to hold the propeller 12 in position. The weed cutter A has an arm-like member 13 which projects between the blades of the propeller 12 and extends to the housing 14 for the upright propeller shaft.

The weed cutter A has beveled cutting edges 15 on either side which cut the weeds which have a tendency to wrap themselves about the propeller 12 and the propeller shaft housing 14. A hole 16 is provided in the plate end 17 which serves the purpose of fitting over the propeller shaft 10 in order that the nut 11 can hold the weed cutter A to the shaft and hold it in its proper position.

As shown in Figure 9 of the drawing, the weed cutter A has two beveled edges 15. In this construction, the weed cutter A can be used on an outboard motor where the propeller shaft is turned in a clockwise and counter-clockwise direction.

The weed cutter B illustrated in Figure 3 of the drawing has a single edge beveled cutter 19 which cuts weeds when the motor propeller is turned in a clockwise direction. The cutter B is formed of strap or ribbon-like steel and may be extended at an obtuse angle, thus forming the cutting arm end 13 and the plate-like attaching end 17. In the cutter B of Figure 3, the plate end 21 has a hole 22 which has a purpose similar to the hole 16 in the cutter A. The plate end member 21 having the hole 22, fits over the propeller shaft and is tightened by the same nut that tightens the propeller to the propeller operating shaft.

A weed cutter C is illustrated in Figure 4 of the drawing which is very similar to the weed cutter A. The weed cutter C is provided with scored slots 23 which are deep enough so that in case the cutter arm 24 is too long, it may be broken off along the scored lines. The scored lines are spaced at intervals, and thereby permit the cutter arm member to be made any desired length. The weed cutter C is provided with beveled cutting edges 15 so that it can also be used in motor boats where the propeller turns in a clockwise and counter-clockwise direction. In the plate end 44, a hole 45 is provided through which means it can be connected to the outboard motor.

The weed cutter D, as illustrated in Figure 5 of the drawing, is provided with a razor blade 25 which has a cutting edge 26 which cuts the weeds when the weed cutter is rotated with the propeller operating shaft. A flat strap material is bent at 27 forming two sides 28 which extend over one side of the razor blade 25. A slot 29 is provided in the arm 30 and a screw 31 projects through the sides 28 and through the slot 29 of the arm member 30. A nut 32 tightens the screw, thus holding the razor blade 25 in a firm position between the sides 28 and the arm member 30. The arm member 30 is provided with turned up flanges 33 between which the plate 28 engages to hold the razor blade 25. A hole 34 is provided in the arm member 30 so that the cutter D may be attached to the shaft 10 as heretofore set forth.

In Figure 6 of the drawing, I show another modified form of my weed cutter where a sharp blade 35 is used and which can be placed so as to cut weeds when the weed cutter is turned in a clockwise or counter-clockwise direction. The cutting blade 35 is held to the arm member 36 by a screw 37 which has a nut means 39. The means of attaching the cutting blade 35 to the arm member 36 is best illustrated in Figure 12 of the drawing. The arm 36 is provided with ribs 38 which help to hold the cutting blade in the proper position with respect to the arm 36. An elongated slot 40 is also provided in the arm 36 through which the screw 37 projects to hold the cutting blade 25 to the arm 36. A hole 41 is provided at one end of the arm 36 through which the propeller shaft extends. This form of weed cutter is held to the propeller shaft by means of a nut 11.

In accordance with the patent statutes, I have described the principles of construction and operation of my weed cutter for outboard motors; and while I have endeavored to set forth the best embodiments thereof, I desire to have it understood that these are only illustrative of a means of carrying out my invention, and that obvious changes may be made within the scope of the following claims without departing from the spirit of my invention.

I claim:

1. A weed cutter for outboard motors including a member having a hole adapted to fit over the propeller shaft and adapted to be held on said shaft by the nut which holds the propeller blades on the propeller shaft, blade-like arm means projecting from said member to extend between the propeller blades and toward the hub thereof, said blade member having cutting edges on either side thereof to cut weeds in either direction of rotation of the propeller.

2. A weed cutter for boat propellers including an obtuse angular arm-like body portion, said arm being adapted to be supported on the propeller shaft by the nut means which holds the propeller on the shaft, and cutting edges formed on said arm adapted to extend between the blades of the propeller and over the hub thereof, whereby the rotation of the propeller and shaft supporting the same rotates said cutter in a manner to cut and prevent weeds from wrapping about the propeller and shaft thereof.

3. A weed cutter for water propellers including an integral arm-like member formed of strap-like material, an opening extending through one end of said member for securing said cutter to the propeller shaft, a nut for holding said cutter in operative position, and cutting edge means formed on said arm projecting forwardly of the propeller shaft and being adapted to cut weeds when rotated with the propeller.

4. A weed cutter in combination with a boat propeller including an arm-like member, a hole in said arm adapted to fit over the propeller shaft and adapted to be secured thereto by the nut which holds said propeller on the shaft, said arm-like member having cutting edge means adapted to cut weeds in the rotation of the propeller.

5. A weed cutter for water propellers including a strap-like arm member, a base portion having means for securing the same to rotate said cutter with the propeller, and cutting edge means projecting from said base portion in a manner to cut weeds when said cutter is rotated to keep the propeller free of entanglement with weeds during its rotation.

6. A weed cutter for outboard motors including a weed cutter knife formed of a single piece of material and having cutting edge means, and means for supporting said cutter to the propeller shaft of the outboard motor by the nut which holds the propeller to the operating shaft.

7. A weed cutter for outboard motors, including a plate-like member, means for securing said plate member to rotate with the propeller blades of the motor, and means for holding a razor blade to the free end of said plate member with one of the sharp edges of the razor blade exposed beyond the edge of said plate member to cut weeds in the rotation of the propeller.

8. A weed cutter for outboard motors including a plate arm member, means for securing said arm to rotate with the propeller blade of the motor, and means for holding a razor blade reversibly to the free end of said plate member with a sharp edge of the razor blade exposed and projecting from either side of said arm to cut weeds in either direction of rotation of the propeller.

ELMER S. OSWOOD.